United States Patent
Shimomura et al.

(10) Patent No.: US 7,399,502 B2
(45) Date of Patent: *Jul. 15, 2008

(54) COMPOSITION OF PERFLUOROALKYL GROUP-CONTAINING ALKYLSILOXY CYCLOALIPHATIC EPOXY RESIN

(75) Inventors: Akihiko Shimomura, Kanagawa (JP); Hiromichi Noguchi, Tokyo (JP); Isao Imamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 450 days.

This patent is subject to a terminal disclaimer.

(21) Appl. No.: 11/166,124

(22) Filed: Jun. 27, 2005

(65) Prior Publication Data

US 2005/0267265 A1 Dec. 1, 2005

Related U.S. Application Data

(62) Division of application No. 10/340,708, filed on Jan. 13, 2003, now Pat. No. 6,992,117.

(30) Foreign Application Priority Data

Jan. 17, 2002 (JP) ............................. 2002-008439

(51) Int. Cl.
  *B05D 3/02* (2006.01)
  *B05D 3/06* (2006.01)
  *C08J 7/04* (2006.01)
  *C08G 59/02* (2006.01)
  *C08L 63/00* (2006.01)
  *C08L 63/02* (2006.01)

(52) U.S. Cl. ................... 427/386; 427/503; 427/515; 525/523; 525/527; 528/15; 528/19; 528/23; 528/27

(58) Field of Classification Search ................ None
See application file for complete search history.

(56) References Cited

U.S. PATENT DOCUMENTS

| | | | |
|---|---|---|---|
| 4,688,052 A | 8/1987 | Inamoto et al. | 346/140 |
| 4,688,053 A | 8/1987 | Noguchi et al. | 346/140 |
| 4,689,640 A | 8/1987 | Shimomura | 346/140 |
| 4,839,668 A | 6/1989 | Sato et al. | 346/140 |
| 4,839,669 A | 6/1989 | Sato et al. | 346/140 |
| 4,954,580 A | 9/1990 | Zahir | 525/476 |
| 4,970,532 A | 11/1990 | Komuro et al. | 346/140 |
| 5,086,307 A | 2/1992 | Noguchi et al. | 346/140 |
| 5,178,959 A | 1/1993 | Eckberg et al. | 428/447 |
| 5,196,558 A | 3/1993 | Inomata et al. | 556/434 |
| 5,451,992 A | 9/1995 | Shimomura et al. | 347/45 |
| 5,510,818 A | 4/1996 | Shimomura et al. | 347/65 |
| 5,524,784 A | 6/1996 | Shiba et al. | 216/27 |
| 5,650,805 A | 7/1997 | Shimomura et al. | 347/20 |
| 5,663,752 A | 9/1997 | Imamura et al. | 347/65 |
| 5,738,911 A | 4/1998 | Imamura et al. | 427/387 |
| 5,770,271 A | 6/1998 | Imamura | 427/412.1 |
| 5,980,026 A | 11/1999 | Imamura et al. | 347/65 |
| 6,260,949 B1 | 7/2001 | Smith et al. | 347/44 |
| 6,291,545 B2 | 9/2001 | Imamura | 522/181 |
| 6,409,931 B1 | 6/2002 | Shimomura et al. | 216/27 |
| 6,472,129 B2 | 10/2002 | Noguchi et al. | 430/326 |
| 6,484,399 B2 | 11/2002 | Aono et al. | 29/890.1 |
| 6,586,495 B1 | 7/2003 | Shimomura et al. | 522/112 |
| 6,750,290 B2 | 6/2004 | Imamura et al. | 525/116 |
| 6,846,520 B2 | 1/2005 | Shimomura et al. | 427/510 |
| 6,869,541 B2 * | 3/2005 | Shimomura et al. | 216/27 |
| 7,074,273 B2 * | 7/2006 | Shimomura et al. | 118/302 |
| 2003/0025760 A1 | 2/2003 | Imamura et al. | 347/45 |
| 2003/0170401 A1 | 9/2003 | Shimomura et al. | 427/496 |
| 2003/0171504 A1 | 9/2003 | Shimomura et al. | 525/474 |

FOREIGN PATENT DOCUMENTS

| | | |
|---|---|---|
| EP | 0 271 873 A2 | 6/1988 |
| EP | 0 319 472 A2 | 6/1989 |
| EP | 0 368 320 A2 | 5/1990 |
| EP | 0 507 493 A1 | 10/1992 |
| EP | 0 572 179 A2 | 12/1993 |
| EP | 0 739 945 A2 | 10/1996 |
| EP | 0 779 337 A1 | 6/1997 |
| EP | 0 942 024 A2 | 9/1999 |
| EP | 1 085 031 A2 | 3/2001 |
| JP | 61-252230 | 11/1986 |
| JP | 2-39944 | 2/1990 |
| JP | 2-33053 | 7/1990 |

* cited by examiner

*Primary Examiner*—Robert Sellers
(74) *Attorney, Agent, or Firm*—Fizpatrick, Cella, Harper & Scinto

(57) ABSTRACT

An epoxy resin composition can be used for forming a film having excellent water-repellency on a substrate surface. The epoxy resin composition contains (a) an epoxy resin having at least two alicyclic epoxy groups, at least one perfluoroalkyl group having 6 to 12 carbon atoms, and at least one alkylsiloxane group and (b) a cationic polymerization catalyst. The alicyclic epoxy groups and the perfluoroalkyl group are present in branched chains of the epoxy resin, and the alkylsiloxane group is present in the main chain of the epoxy resin.

7 Claims, 5 Drawing Sheets

COMPOSITION OF PERFLUOROALKYL GROUP-CONTAINING ALKYLSILOXY CYCLOALIPHATIC EPOXY RESIN

This Application is a division of application Ser. No. 10/340,708, filed Jan. 13, 2003, now U.S. Pat. No. 6,992,117 B2, the entire disclosure of which is incorporated herein by reference.

BACKGROUND OF THE INVENTION

1. Field of the Invention

The present invention relates to a curing epoxy resin composition which permits water repellent and ink-repellent surface treatment. Particularly, the present invention relates to an epoxy resin composition capable of forming a film pattern by ultraviolet irradiation, a surface treatment method using the resin composition, a liquid-jet recording head subjected to ink-repellent treatment with the epoxy resin composition, and a liquid-jet recording apparatus using the liquid-jet recording head.

2. Description of the Related Art

In various fields, a method of applying a water-repellent coating to a member required to have water resistance and ink repellency to obtain these properties is generally known, and resin materials and coating materials used for the method have been developed. For example, films of fluoropolyolefin and a fluororesin coating material having perfluoro groups are thermally and chemically stable, excellent in weather resistance, water resistance, chemical resistance, solvent resistance, etc., and further excellent in release property, abrasion resistance and water repellency; such films are widely used for various applications.

Meanwhile, a liquid-jet recording head adapted to discharge liquid droplets such as ink droplets through discharge nozzles and cause them to adhere to a recording medium such as a sheet of paper so as to record or form an image thereon has only recently been required to be able to discharge smaller liquid droplets, be driven with a higher driving frequency, and have a larger number of nozzles in order to improve recording properties. Therefore, a treatment for maintaining the nozzle surface in a clear state becomes more important. However, it is difficult to selectively treat the surface of a nozzle or precisely treat the surface in the form of a pattern using any existing material which avoids ink adhesion. This is because first, a material mainly comprising a compound having a photosensitive functional group must be used as a surface treatment material for treating the surface in the form of a pattern so that the material has characteristics like photoresist suitable for pattern treatment; however, it is very difficult to design the molecule of such a compound so that the compound has water repellency and ink repellency at the same time.

Second, if the nozzle surface can be treated with an existing fluorocarbon material, a film structure must be designed so as to maintain the properties of the surface for a long period of time. A material permitting such a pattern surface treatment having the above-described properties is extremely valuable for surface treatment of an ink-jet print head, as described below.

Namely, in an ink-jet recording system in which an ink is ejected as droplets, the discharge orifice (nozzle) is preferably designed to have the following characteristics:

(1) The residual ink of ink columns having turned into droplets is immediately held back into the nozzle.

(2) The ink droplets adhering to the nozzle surface can be readily wiped off by a cleaning operation.

(3) The nozzle surface has excellent scratch resistance against the cleaning operation and paper transfer.

(4) In repeated formation of droplets and ink refilling, a meniscus is formed on the nozzle surface (refer to reference numeral 23 in FIG. 1).

(5) The discharge direction is normal to the meniscus.

(6) Even with an ink having low surface tension or under low-negative pressure, the interfacial tension, i.e., the contact angle, is sufficient to form the meniscus.

The above-noted characteristics are required for the discharge orifice because if a recording liquid such as an ink adheres to the periphery of the orifice, the discharge (flying) direction of the ink droplets discharged from the orifice deviates, making it impossible to print highly accurately and directly degrade the printing performance. In order to prevent adhesion of the ink to the vicinity of the discharge orifice, which causes a deviation in the discharge direction, a method is known in which the surface of the discharge orifice is subjected to water-repellent treatment.

For example, a method of ink-repellent treatment with a polymer having fluoroacetyl groups and silazane groups is known as prior art relating to the above-described surface treatment (for example, Japanese Patent Laid-Open No. 2-39944). On the other hand, as a result of the increasing demand for sophisticated printers utilizing liquid-jet recording systems for recording images, the recording liquid to be used for such recording systems is also required to show sophisticated characteristics. More often, the recording liquid to be used for such recording systems is chemically regulated to be basic with a pH value of 7 to 11 in order to further improve dissolution stability and dispersion stability of contents, and thus a structural material highly resistant against alkali and hydrolysis must be used for a printer member.

However, when a recording liquid containing a polar organic solvent or a recording liquid showing such a high pH value is used, a water-repellent agent applied for treating the surface of the discharge orifice in order to satisfy the above requirements can damage the film forming property of the agent and the tight adhesion of the agent to the surface of the discharge orifice as it comes into contact with the solvent of the recording liquid, particularly the polar organic solvent of the recording liquid. Then, the coat of the water-repellent agent can be peeled off to decrease the water repellency of the surface.

SUMMARY OF THE INVENTION

Therefore, it is an object of the present invention to provide an epoxy resin composition that can be suitably used for a water-repellent agent or water-repellent coating to be applied to a surface that can be brought into contact with a solution or material containing a component such as a polar organic solvent that can damage the film forming ability and the adhesion of the water-repellent agent.

It is another object of the present invention to provide an epoxy resin composition adapted to surface modifying treatment for maintaining the treated surface constantly in a clear state.

Still another object of the present invention is to provide a surface treatment method capable of precisely imparting water-repellency to a surface of a member by using the epoxy resin composition in a position-selective manner.

A further object of the present invention is to provide a liquid-jet recording head and liquid-jet recording apparatus in which the surface of a substrate is treated with the epoxy resin composition so that the surface of a nozzle can be constantly maintained in a clear state, and an ink does not adhere to the surface of a printing head even when the head is brought into contact with a recording medium for a long period of time, thereby exhibiting high dot landing precision, and permitting long-term maintenance of printing quality.

These objects are achieved by the present invention as described below.

In an embodiment of the present invention, an epoxy resin composition comprises (a) an epoxy resin having at least two alicyclic epoxy groups, at least one perfluoroalkyl group having 6 to 12 carbon atoms, and at least one alkylsiloxane group; and (b) a cationic polymerization catalyst. In the epoxy resin composition, the alicyclic epoxy groups and the perfluoroalkyl group are present in branch chains of the epoxy resin, and the alkylsiloxane group is present in the main chain of the epoxy resin.

In another embodiment of the present invention, a surface treatment method comprises (i) coating the epoxy resin composition on the surface of a substrate to form a film; (ii) irradiating at least a portion of the film with an active energy ray (position-selective manner); and (iii) dissolving at least a portion of the film which was not irradiated with the active energy ray in a liquid capable of dissolving the film.

In still another embodiment of the present invention, a surface treatment method comprises (i) coating the epoxy resin composition on the surface of a substrate to form a film; (ii) curing at least a portion of the film by polymerization; and (iii) selectively removing an uncured portion of the film.

In a further embodiment of the present invention, a liquid-jet recording head comprises a discharge orifice for discharging a liquid, wherein at least the periphery of the discharge orifice is coated with a cured film of the epoxy resin composition.

In a still further embodiment of the present invention, a liquid-jet recording apparatus comprises the above-described liquid-jet recording head.

The epoxy resin composition of the present invention is an epoxy resin system, and thus a film comprising the resin composition has excellent adhesion to various members and can be cured at a relatively low temperature to provide a cured product having excellent physical properties as a structural material. Furthermore, since the epoxy resin composition contains an epoxy compound having an alkylsiloxane group and perfluoroalkyl group, the film is significantly improved in resistance to water-soluble organic solvents, particularly polar organic solvents. The film also has improved resistance to pigment dispersion stabilizer and the like contained in a pigment-based ink. Furthermore, when the resin composition contains a compatibilizer, the compatibilizer provides compatibility between the components of the resin composition, thereby widening the range of component materials of the resin composition of the present invention.

When the film formed by coating the resin composition of the present invention and then drying the coating contains, as a catalyst, an onium salt of a Lewis acid which is activated with an active energy ray, the film can be cured in the form of a pattern. Therefore, uncured portions of the film are then removed to permit surface treatment of a member in the form of a pattern.

The surface of a member can be treated in the form of a pattern by a method comprising coating the resin composition on the substrate and then drying the coating to form a film, irradiating the film with an active energy ray through a mask having a desired pattern, and then removing uncured portions of the film by development with a developer. Although the basic steps of this pattern treatment are the same as a photolithography method, a solvent or solvent composition suitable for the film comprising the resin composition is selected as the developer. As the developer, an aromatic hydrocarbon, a ketone, an ester, glycol ester, or a mixture thereof can be used.

In the surface treatment in the form of a pattern using the resin composition of the present invention, so-called post-curing is preferably further performed by heating the film or irradiating the film with an active energy ray after development to completely cure the film of the resin composition.

Therefore, the resin composition of the present invention can be suitably used as a water-repellent agent or water-repellent coating material applied to an area having opportunity for contact with a solution or material containing a component such as a polar organic solvent, which can damage adhesion of the water-repellent agent. The resin composition of the present invention is further suitably used for water-repellent and ink-repellent treatment of the discharge orifice surface of the liquid-jet recording head.

Namely, when the resin composition of the present invention is applied to an ink-jet recording apparatus, the precision of selective surface modifying treatment using optical polymerizability, the solid strength of the cured film, the durability as a device due to frictional strength, and the high degree of water repellency and ink repellency result in improvements in properties such as meniscus retention of an aqueous ink, cleaning property, droplet discharge direction precision, persistency of continuous discharge, suitability for print start after a pause, etc. The meniscus retention represents the property by which an ink maintains the ink surface at the nozzle tip by surface tension and recovers and holds a meniscus at a predetermined position during repeated droplet discharges. With low meniscus retention, the ink leaks from the nozzle tip, the meniscus retreats to decrease the volume of the droplet discharged, or in an extreme case, a defect occurs in the discharge of ink droplets.

Further objects, features and advantages of the present invention will become apparent from the following description of the preferred embodiments with reference to the attached drawings.

DESCRIPTION OF THE PREFERRED EMBODIMENTS

Figure 1:
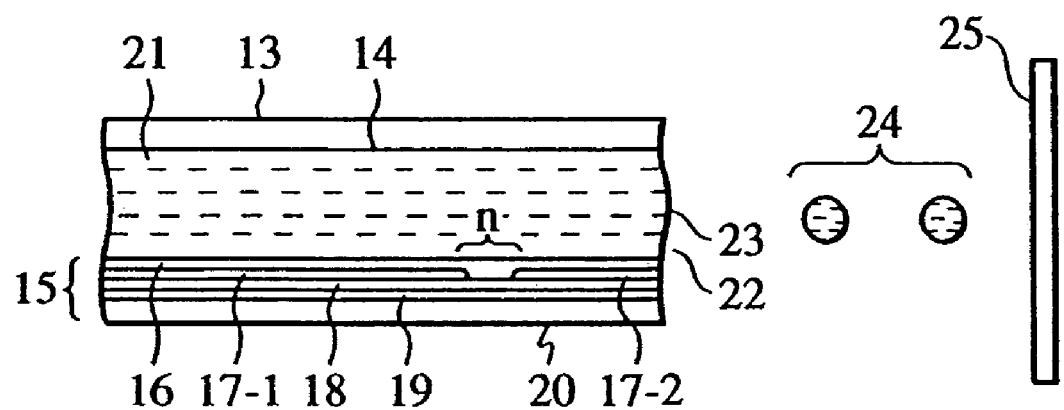
FIG. 1 is a sectional view showing a principal portion of an example of a liquid-jet recording head.

The present invention will be described in detail below with reference to a preferred embodiment.

An epoxy resin composition of the present invention comprises (a) an epoxy resin having at least two alicyclic epoxy groups, at least one perfluoroalkyl group having 6 to 12 carbon atoms, and at least one alkylsiloxane group; and (b) a cationic polymerization catalyst. In the epoxy resin composition, the alicyclic epoxy groups and the perfluoroalkyl group are present in branch chains of the epoxy resin, and the alkylsiloxane group is present in the main chain of the epoxy resin.

The epoxy resin of the epoxy resin composition is not limited as long as the above conditions are satisfied. Examples of the epoxy resin of the present invention include epoxy resins represented by formula (1):

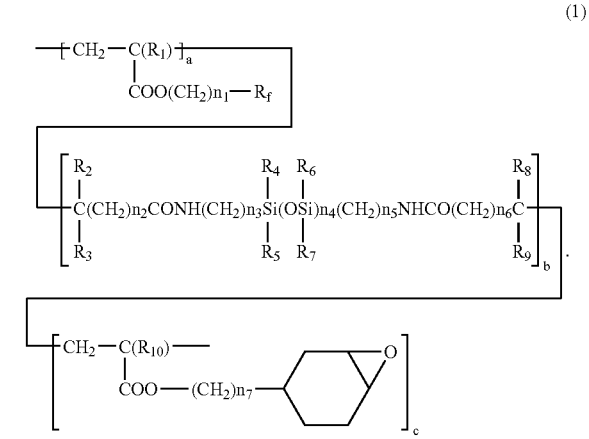

(1)

In formula (1), a is an integer from 1 to 50, b is an integer from 1 to 50, and c is an integer from 2 to 100. Furthermore, each of $n_1$, $n_2$, $n_3$, $n_5$, $n_6$, and $n_7$ is an integer from 1 to 5, and $n_4$ is an integer from 2 to 200.

In formula (1), each of $R_1$, $R_4$, $R_5$, $R_6$, $R_7$, and $R_{10}$ is independently a hydrogen atom or a straight or branched chain alkyl group having 1 to 3 carbon atoms, each of $R_2$, $R_3$, $R_8$ and $R_9$ is independently a hydrogen atom, a straight or branched chain alkyl group having 1 to 3 carbon atoms, or a nitrile group, and $R_f$ is a straight or branched chain perfluoroalkyl group having 6 to 12 carbon atoms, particularly a perfluoroalkyl group having 8 to 10 carbon atoms.

The epoxy resin represented by formula (1) can be obtained by copolymerization of perfluoroalkyl methacrylate, 3,4-oxycyclohexylmethyl methacrylate, and an azo group-containing polysiloxaneamide at an appropriate monomer ratio according to an ordinary method. The epoxy resin may also be commercially obtained.

More specifically, the epoxy resin can be synthesized by heating, light irradiation or heating and light irradiation of a compound represented by structural formula (1)-i below in coexistence with vinyl monomers represented by structural formulae (1)-ii and (1)-iii so as to produce radical species.

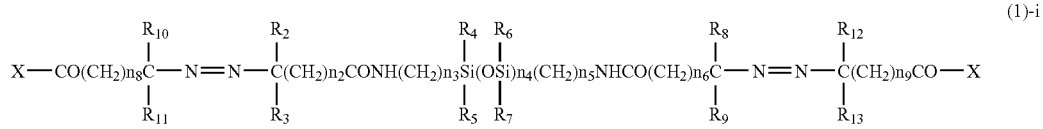

(1)-i wherein $R_1$ to $R_{13}$ are the same as $R_2$, $R_3$, $R_8$ and $R_9$ above, $n_8$ and $n_9$ each represent 0 or an integer from 1 to 6, and X represents a halogen atom.

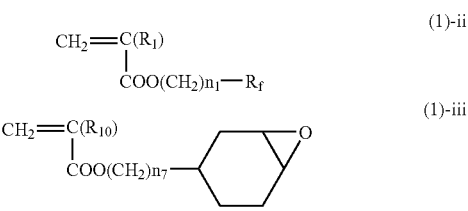

(1)-ii (1)-iii wherein $R_1$, $R_{10}$, $n_1$, and $n_7$ are the same as defined above.

A compound represented by formula (1)-i can be synthesized by the method disclosed in, for example, Japanese Patent Publication No. 2-33053. Namely, the compound can be obtained by reaction of a diamine represented by formula (1)-iv below and dihalides represented by formulae (1)-v and (1)-vi below.

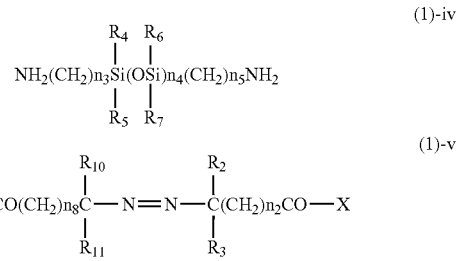

(1)-iv (1)-v

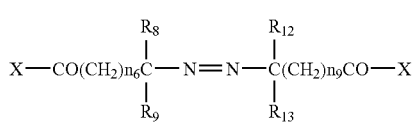

(1)-vi

The epoxy resin composition represented by formula (1) preferably has a number average molecular weight of 8,000 to 22,000, and more preferably has a number average molecular weight of 8,500 to 20,000 in light of the durability of the water-repellent coating.

An example of the epoxy resin represented by formula (1) is an epoxy resin represented by formula (2) below. In formula (2), $R_f$, $n_4$, and a, b and c are defined as above.

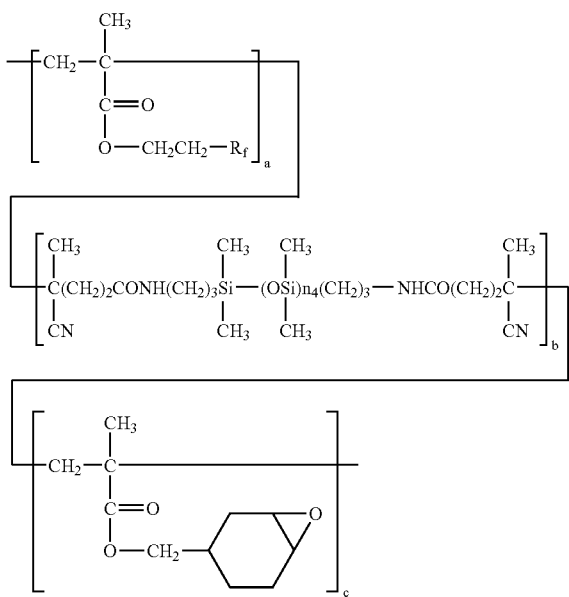

(2)

Preferably, in the resin represented by structural formula (2), a is 20 to 50, b is 5 to 40, c is 20 to 70, n is 20 to 150, and the number average molecular weight is 8,000 to 20,000.

A more preferred example of the epoxy resin is an acrylic epoxy resin (A-1) having a number average molecular weight of about 20,000 and represented by the following structural formula in which the monomer unit a is 40 mol %, the monomer unit b is 20 mol %, and the monomer unit c is 40 mol %:

(A-1)

In the structure represented by formula (1) or (2), a 3,4-epoxycyclohexyl group is shown as an alicyclic epoxy group. However, the alicyclic group is not limited to this, and a cyclopropyl group or cyclohexyl group may be introduced.

The epoxy resin may be used independently. Since the resin has a high molecular weight, the resin is preferably mixed with an oligomer having a lower molecular weight of the resin and a solvent to improve coating performance for a substance to be treated with the resin composition and to improve the drying property of a film after the solvent is evaporated, thereby improving the workability of treatment. Namely, the resin represented by formula (1) or another high molecular weight resin is preferably used to function as a binder. The resin represented by formula (1) or other high molecular weight resin is preferably used as the binder for exposure work in the form of a pattern on a resin film. The oligomer is preferably a resin having a lower molecular weight than the resin represented by formula (1), but another low molecular weight oligomer may be used.

Although the resin composition of the present invention mainly comprises the epoxy resin represented by formula (1) and the catalyst, the resin composition preferably further contains at least one compatibilizer according to demand. Preferred examples of the compatibilizer include compounds represented by the following formula (3) and (4):

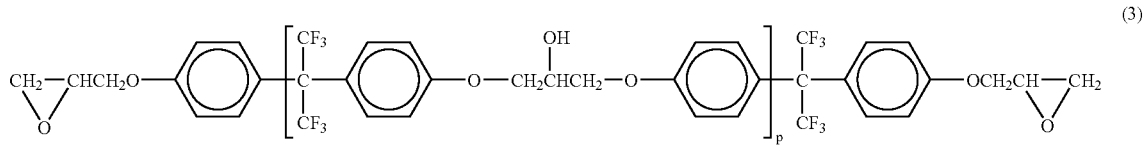

(3)

wherein p is an integer from 0 to 2.

A preferred example of this compound is a compound where p is 0, i.e., 2,2-bis(4-glycidyloxyphenyl)hexafluoropropane.

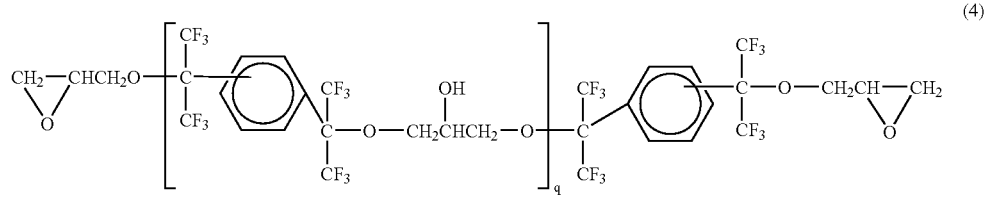

(4)

wherein q is an integer from 0 to 2, and

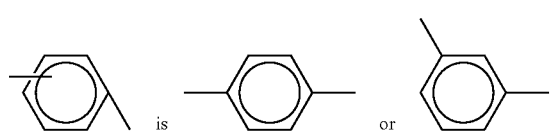

A preferred example of this compound is a compound where q is 0, i.e., m-bis-[1-(2,3-epoxypropoxy)-2,2,2-trifluoro-1-(trifluoromethyl)ethyl]benzene.

The compound represented by formula (3) or (4) has a fluoroalkyl group, and thus the film formed by using such a compound only minimally decreases the surface energy and has low water repellency and ink repellency because of its short chain length. The compound represented by formula (3) or (4) can be synthesized by reaction of a divalent alcohol and epichlorohydrin corresponding to a compound in which groups containing the epoxy groups at both ends are removed from the compound represented by general formula (3) or (4) by an ordinary method.

The resin composition of the present invention contains a polymerization initiator as a catalyst for curing the resin composition. In the present invention, particularly, the resin composition is designed so as to have high reactivity to an onium salt of a Lewis acid which is activated by an active energy ray permitting curing at low temperature. Therefore, the surface of a substrate can be selectively treated by a photolithography method using the resin composition, and the resin composition is suitable for surface modification of a substrate which cannot be easily maintained at high temperature. Examples of the catalyst include bis(4-tert-butylphenyl) iodonium salt, Optomer SP-150 and Optomer SP-170 (trade name, produced by Asahidenka Kogyo Co., Ltd.), and the like.

The chemical structure of Optomer SP-150 is represented by the following formula:

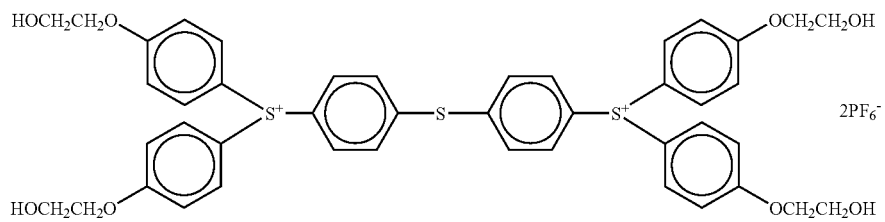

The chemical structure of Optomer SP-170 is represented by the following formula:

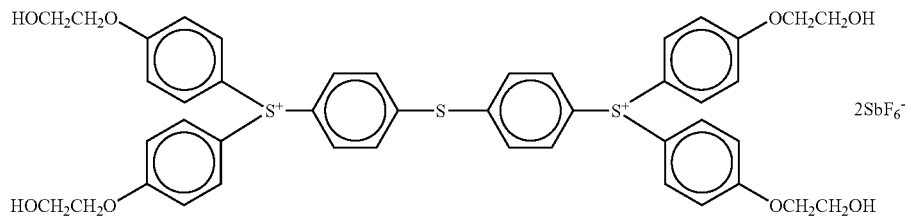

In addition, Irgacure 261 (trade name, produced by Chiba Specialty Co., Ltd.) represented by the following structural formula, and the like can also be used as the polymerization initiator:

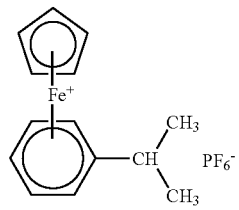

The resin composition of the present invention is preferably combined with an epoxy polymer which can participate in a cross-linking reaction by itself, as a binder polymer other than the resin represented by formula (1). Examples of such a polymer include an acrylic resin obtained by copolymerization of an acryl monomer having a side chain epoxy group, a vinyl polymer obtained by polymerization of a vinyl monomer having an alicyclic epoxy group in its side chain, a polyester polymer having an alicyclic epoxy group in its side chain (for example, EHPE3150, produced by Daicel Chemical Industries, Ltd.), and the like. If a polymer without such an epoxy group is used, physical properties are intentionally controlled according to the application thereof. Examples of such a polymer include general purpose polymer compounds for coating, such as polymers of bisphenol epoxy resins (trade names PKHC and PKHJ, produced by Union Carbide Co., Ltd.), poly(ethylene/vinyl acetate), phenol resins, polycarbonate resins, polyester resins, polyamide resins, soluble polyimide resins, and the like.

As described above, the epoxy resin composition of the present invention basically contains the components below in a nonpolar solvent.

(a) epoxy resin;
(b) cationic polymerization catalyst; and
(c) compatibilizer if required.

The preferred mixing ratio of these components (a), (b) and (c) in the resin composition is as follows.

When the component (a) is used together with an oligomer, the mixing ratio depends upon the softening point and glass transition temperature of both components, and thus the ratio is not generally limited. However, the ratio of oligomer : component (a) is 10:90 to 90:10 (ratio by mass). The ratio of the catalyst (b) is in the range of 0.5 part by mass to 7 parts by mass relative to 100 part by mass of the total amount of the epoxy resin components. In some cases, the oligomer has low compatibility with the polymer, and thus the compatibilizer (c) is preferably used.

The epoxy resin composition of the present invention is used for treating the surface of a substrate by heating or irradiation with an active energy ray. Specifically, the resin composition of the present invention is dissolved in an aromatic solvent, an aliphatic hydrocarbon solvent, an ester solvent, an ether solvent, a fluorocarbon solvent, or the like, and the resultant solution can be coated on the surface of the substrate by any one of various coating/printing methods such as roll coating, spin coating, spray coating, screen printing, gravure printing, etc. After the solution is coated on the surface of the substrate, the formed film is cured by heating or irradiation with an active energy ray. As a source of an active energy ray for curing, a mercury lamp, a laser beam, an electron beam, or the like, which contains large amounts of bright line spectra in the range of wavelengths from 200 to 480 nm, is preferred.

The epoxy resin composition of the present invention preferably contains the binder component and is prepared so as to form a dry solid film. Also, the epoxy resin composition can facilitate selective surface treatment of the substrate by patterning similar to a photoresist process. In this case, a coating solution containing the resin composition of the present invention is coated on the substrate, and then the solvent is removed to form a dry film. Then, the film is irradiated with an active energy ray through a mask having an appropriate pattern or irradiated with an active energy ray in the form of a pattern, and then the uncured portion of the film is removed by development with a solvent system which can dissolve the film. When energy beam irradiation in the form of a pattern is insufficient for curing, post-curing is preferably performed after development. As an energy source for post-curing, heating with a microwave or the like or an active energy ray irradiation by an electron beam, ultraviolet rays, or the like is used.

The above-described surface modifying method of the present invention enables water-repellent and oil-repellent treatment with excellent film adhesion to the substrate and surface hardness of the film, and thus has the great advantage that the substrate can be modified to have excellent durability.

In an example of application of the epoxy resin composition of the present invention to a liquid-jet recording head, for example, an ink-jet recording head, the nozzle surface of the liquid-jet recording head is treated with the resin composition of the present invention to form a surface which exhibits no strong adhesion of an ink and which has good release property, facilitating wiping of the ink adhering to the nozzle surface by a cleaning operation.

A cleaning mechanism may be mounted on the liquid-jet recording head, for example, the ink-jet recording head, or a cleaning method may be performed. In this regard, for example, the ink adhering to the orifice surface of the ink-jet recording head may be wiped with a rubber blade, the ink in a nozzle may be sucked by a pump, or the ink may be discharged at a position other than on a recording sheet. Any-one of these methods cannot eliminate the phenomenon that small droplets of excessive ink adhere to the periphery of the nozzle because not all of the ink is turned into ink droplets when an ink column withdrawn by discharge pressure forms into a droplet. Therefore, if the small droplets spontaneously drop, are sucked back to the inside of the nozzle, or are readily removed, the droplets have no influence on ink discharge.

The epoxy resin composition of the present invention can be cured at relatively low temperature to provide a cured film having excellent water repellency, oil repellency, adhesion to the substrate, chemical resistance, and friction resistance.

Figure 2:
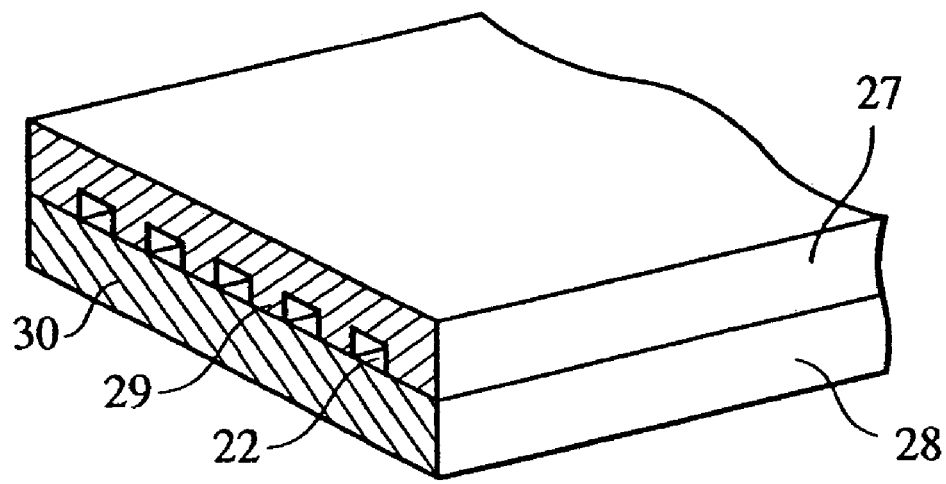
FIG. 2 is a perspective view of the principal portion of the head shown in FIG. 1.

FIGS. 1 and 2 show the principal portion of an example of the construction of a liquid-jet recording head to which the resin composition of the present invention can be applied.

FIG. 1 is a sectional view taken along a flow path of an ink, and FIG. 2 is a perspective view of the liquid-jet recording head shown in FIG. 1.

The recording head 13 shown in FIG. 1 comprises a substrate 15 on which a discharge energy generator (17, 18, 19) is disposed, and a member 14 laminated on the substrate 15 by forming a predetermined pattern of a cured product of a thermosetting resin composition and/or an active energy ray curing resin composition to form at least a flow path.

The substrate 15 comprises a base 20 made of a material with a high heat release effect, such as alumina or the like, and a heat storage layer 19, an exothermic resistor layer 18 made of a metal, electrodes 17-1 and 17-2 made of aluminum or the like, and a protective layer 16, which are laminated, in that order, on the surface of the base 20. By supplying electricity to the electrodes 17-1 and 17-2, the discharge energy generating element formed in a portion (in the region shown by character n in FIG. 1) of the exothermic resistor layer 18, in which the electrodes are not formed, generates heat to exert thermal energy on an ink positioned above the element.

In recording, in the state in which an ink 21 is caused to fill in a discharge orifice (orifice) 22 as a micro opening at the tip of the member 14, when a current is passed through the electrodes 17-1 and 17-2 corresponding to a recording signal, heat is rapidly generated from the region n, and bubbles occur in the ink 21 in contact with the region n due to film boiling to discharge the ink 21 as droplets 24 from the orifice 22 by the pressure of the bubbles. Therefore, the droplets 24 fly toward a recording medium 25.

In the liquid-jet recording head according to the present invention, a cured film 30 comprising the resin composition of the present invention is used as a water-repellent and ink-repellent agent in the peripheries of at least the orifice openings 22 of the orifice surface 29 (FIG. 2), thereby preventing the droplets from adhering to the surface to prevent a deviation in the discharge direction of the droplets. In addition, the cured film comprising the resin composition of the present invention not only exhibits excellent adhesion to the substrate, but also causes no deterioration in water repellency and adhesion even when the ink contains an organic solvent, particularly, a polar organic solvent.

Figure 3:
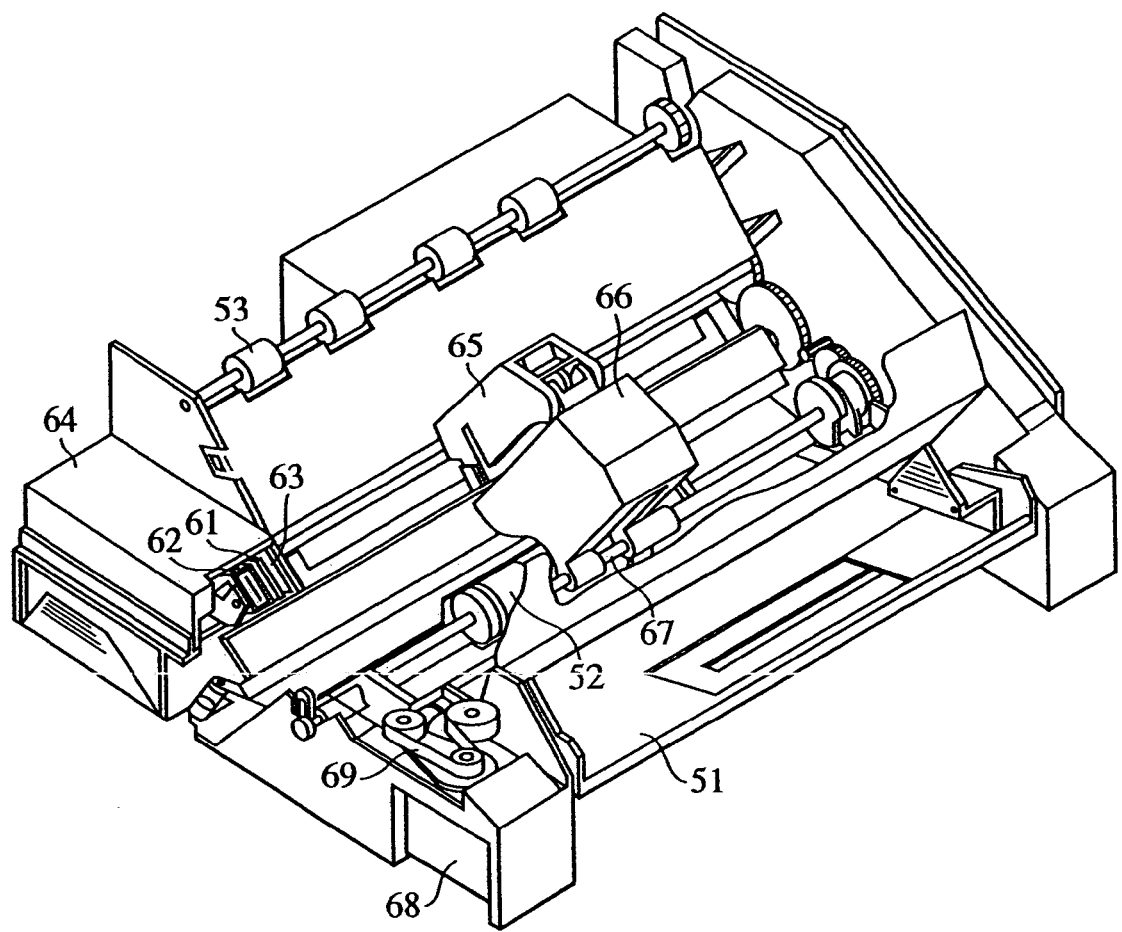
FIG. 3 is a drawing showing an example of a liquid-jet recording apparatus including a multi-head.

FIG. 3 shows an example of a liquid-jet recording apparatus including such a multi-head as shown in FIG. 2. In FIG. 3, reference numeral 61 denotes a blade serving as a wiping member, one end of which is a fixed end held by a blade holding member to establish a cantilever state. The blade 61 is disposed at a position adjacent to a recording region of the recording head. In this example, the blade 61 is held to project into the movement path of the recording head. Reference numeral 62 denotes a cap disposed at a home position adjacent to the blade 61 and is moved perpendicularly to the movement direction of the recording head to cap the orifices in contact therewith.

Furthermore, reference numeral 63 denotes an ink absorber provided adjacent to the blade 61 and held to project into the movement path of the recording head in the same manner as the blade 61. The blade 61, the cap 62 and the ink absorber 63 constitute a discharge recovery section 64 for removing moisture, dust particles, and the like from the ink discharge orifice surface by the blade 61 and the ink absorber 63.

Reference numeral 65 denotes a recording head for recording in a liquid-jet system, for example, having a construction in which an ink is discharged by thermal energy, as shown in FIGS. 1 and 2. Reference numeral 66 denotes a carriage for moving the recording head 65 mounted thereon. The carriage 66 is slidably engaged with a guide shaft 67 and partially connected (not shown in the drawing) to a belt 69 driven by a motor 68. Therefore, the carriage 66 can be moved along the guide shaft 67, i.e., can be moved to the recording region of the recording head 65 and the adjacent region thereof.

Reference numeral 51 denotes a paper feed section into which a recording medium is inserted, and reference numeral 52 denotes a paper feed roller driven by a motor not shown in the drawing. This construction permits the recording medium to be fed to a position opposite to the discharge orifice surface of the recording head and expelled through a paper-expelling roller 53 as recording proceeds.

In the above-described construction, when the recording head 65 is returned to the home position at the end of recording, the cap 65 of the head recovery section 64 retreats from the movement path of the recording head 65, while the blade 61 projects into the movement path. As a result, the orifice surface of the recording head 65 is wiped. When the recording head 65 is capped with the cap 62 in contact with the orifice surface, the cap 62 is moved to project into the movement path of the recording head 65.

When the recording head 65 is moved from the home position to the start position of recording, the cap 62 and the blade 61 are at the same positions as at the time of wiping. As a result, in this movement, the orifice surface of the recording head 65 is wiped. The recording head 65 is moved to the home position at the times of recording end and recovery, but the recording head 65 is also moved to the home position adjacent to the recording region of the recording head at predetermined intervals when the recording head 65 is moved in the recording region for recording. During this movement, the discharge surface is also wiped.

In color recording, the ink jet recording apparatus can use a recording head in which discharge orifices for cyan, magenta, yellow and black inks are arranged in parallel. Alternatively, recording heads for the respective colors may be arranged in parallel. In this case, each of the color inks may be discharged from one discharge orifice or simultaneously discharged from a plurality of discharge orifices to adhere at least two droplets of the same color to the recording medium.

The liquid-jet recording head of the present invention is subjected to surface treatment with an ink repellent treatment material comprising the above-described epoxy resin composition of the present invention and has the chemical properties described in the examples below. Therefore, an ink adheres less, or adhered ink can be easily removed by a cleaning wiper blade, thereby significantly improving substantial retention of a print.

An example of the method of using the epoxy resin composition of the present invention will be described. In curing a film comprising the resin composition of the present invention with an active energy ray, as described above, a photo cation catalyst which releases a Lewis acid by light is used as a catalyst.

Film Forming Method

The epoxy resin composition of the present invention used in this method is dissolved in an organic solvent and used in the form of a coating solution. With a coating thickness of as small as several μm, an ordinary fine coating device such as a roll coater, a spin coater, a spray coater, or the like can be used. Alternatively, the coating solution may be coated on a release sheet to form a dry film, and the dry film may be bonded to the surface of a substrate using a laminator or the like to form a film on the surface of the substrate.

A first method of treating the surface of the substrate in the form of a pattern can be achieved by selectively irradiating the film with an active energy ray through a mask having a predetermined pattern and then performing development with a developer to remove uncured portions of the film. Although these basic steps are the same as the photolithography process, a solvent or a solvent composition suitable for the film comprising the resin composition of the present invention must be selected as the developer. As the developer, any one of aromatic hydrocarbons, ketones, esters, glycol ethers, and the like, and mixtures thereof can be used. In order to achieve the completion of the curing reaction of the film, heating or active energy ray irradiation is preferably performed as post-curing after development.

A second method of treating the surface of the substrate in the form of a pattern comprises the first step (1) of coating the coating solution on the substrate and drying the coating to form a film, the second step (2) of irradiating the whole surface with an active energy ray which accelerates polymerization to cure the film, and the third step (3) of irradiating the film with a decay active energy ray to selectively remove a desired portion of the cured portion of the film. As the active energy ray for accelerating polymerization, ultraviolet rays rich in light at wavelengths from 250 to 480 μm can be used. As the decay active energy ray, light at wavelengths of 210 μm or less, an excimer laser, or the like can be used. In the second method, in order to complete curing of the film, the film is preferably heat-treated or irradiated with a polymerizing active energy ray in any one of the steps.

As described above, the epoxy resin composition of the present invention is useful as a water repellent agent or water repellent coating material applied to a surface which may come into contact with a solution or a material containing a component such as a polar organic solvent, which deteriorates the adhesion of the water repellent agent. The epoxy resin composition can also be used for water repellent and ink repellent treatment of the discharge orifice surface of the liquid-jet recording head.

EXAMPLES

The present invention is described in further detail below with reference to examples and comparative examples. In the description below, "%" represents a percent by mass unless otherwise specified. Examples of the construction of the resin composition of the present invention are described below. In the description below, a ratio represents a ratio by mass of a solid content, and resin A-1 represents the above-described resin example.

Composition Example 1

Resin A-1:Optomer AP-170=96:4 (used in Example 1 below)

Composition Example 2

Resin A-1:Optomer AP-170=94:6 (used in Example 2 below)

Composition Example 3

Resin A-1:Optomer AP-170:1,4-bis(2-hydroxyhexafluoroisopropyl)benzene=95:5:25 (used in Example 3 below)

Composition Example 4

Resin A-1:Optomer AP-170:1,4-bis(2-hydroxyhexafluoroisopropyl)benzene:2,2-bis(4-glycidyloxyphenyl)hexafluoropropane=80:5:25:25 (used in Example 4 below)

Examples 1 to 4

Each of Composition Examples 1 to 4 was added to diethylene glycol dimethyl ether as a solvent and dissolved therein to form a 30% to 40% solution. Then, each of the prepared solutions was applied to a silicon wafer substrate having a 5-μm thick thermally oxidized film by means of a spinner to have a thickness of 1 to 3 μm in a wet state. Then, the substrate was dried on a hot plate at 110° C. for 5 minutes to remove the solvent. Then, the substrate was irradiated with ultraviolet rays to an accumulated dose of 2 J/cm$^2$ by means of an ultraviolet ray irradiation apparatus using a high-pressure mercury lamp. Thereafter, the substrate was heated in a furnace at 150° C. for 15 minutes to complete the curing reaction. The thus-formed four substrates were measured as described below.

T1: Measurement of Contact Angle

The static contact angle of the cured film of each of the substrates was measured using pure water, a 10% aqueous solution of oleic acid, a 20% aqueous solution of glycerin, and a 1% aqueous solution of a surfactant (polyoxyethylene nonyl phenyl ether; HLB=10) at room temperature.

T2: Measurement of Contact Angle After Immersion in a Water Dispersion of Dye

Each of the substrates having the cured films was immersed in an aqueous solution (pH=10.3) containing 5% carbon black and 1% styrene/acrylic acid copolymer at 60° C. for 7 days. Then, each of the substrates was cleaned with pure water and then dried, and the contact angle of an ink was measured again by the same method as the above-described measurement T1.

T3: Long-term Printing Durability

Figure 4A:
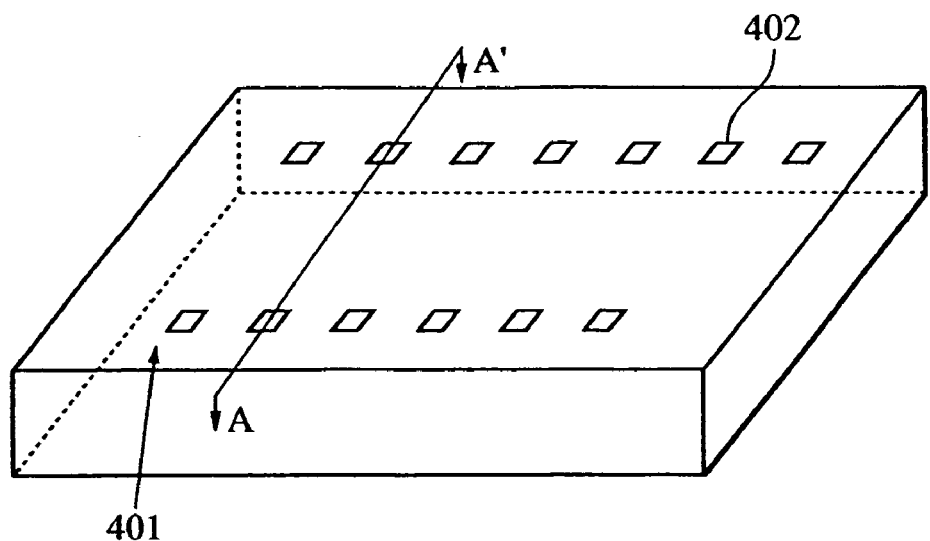
FIGS. 4A to 4C are drawings respectively showing steps of a method of manufacturing a liquid-jet recording head of the present invention.
Figure 4B:
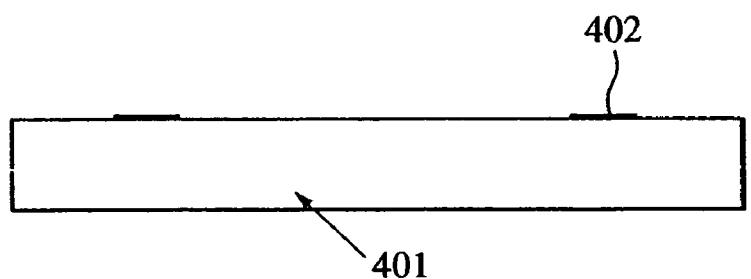
Figure 4C:
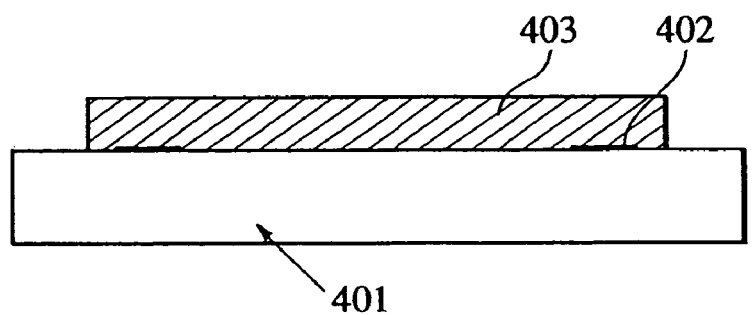
Figure 5A:
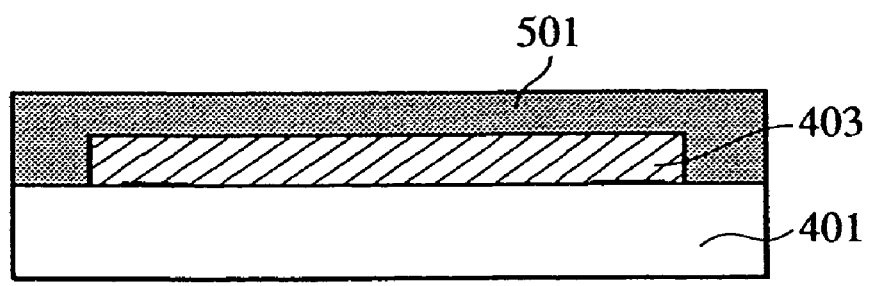
FIGS. 5A to 5C are drawings respectively showing steps performed after the steps shown in FIG. 4C.

As shown in FIGS. 4A to 4C, positive type photoresist (trade name ODUR-1010, produced by Tokyo Ohka Kogyo Co., Ltd.) was coated to a thickness of 13 μm on a substrate 401 to be treated; the substrate had been previously provided with discharge energy generating elements 402, by spin coating to form a resist layer 403, as shown in FIG. 4C. Then, an epoxy resin composition having the composition shown in Table 1 was deposited to a thickness of 25 μm as a flow path forming material 501 on the resist layer 403, as shown in FIG. 5A.

TABLE 1

Construction of Epoxy Resin Composition

| Composition | Parts by mass |
|---|---|
| Cyclic epoxy resin (EHPE3150, Daicel Chemical Co., Ltd.) | 95 |
| NUC silane coupling agent A-187 (produced by Nippon Uniker Co., Ltd.) | 5 |
| Optomer SP-170 (produced by Asahi Denka Kogyo Co., Ltd.) | 2 |
| Diethylene glycol dimethyl ether | 100 |

Figure 5B:
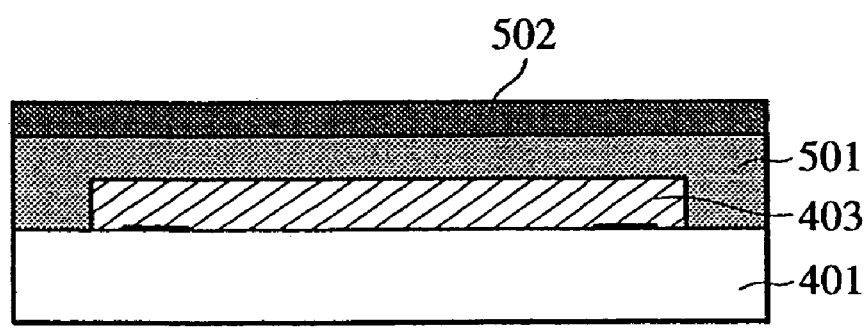
Figure 5C:
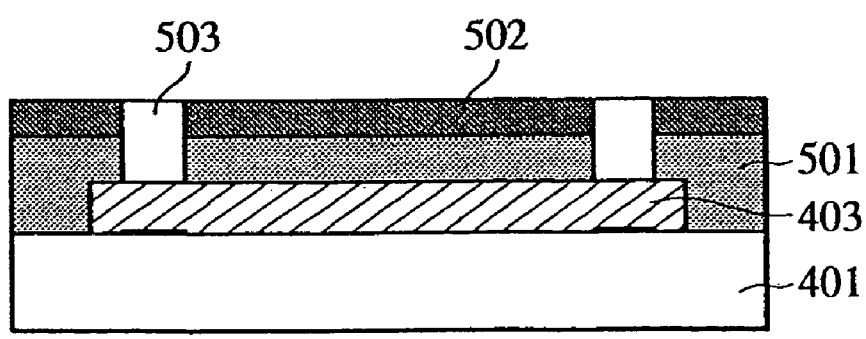
Figure 6A:
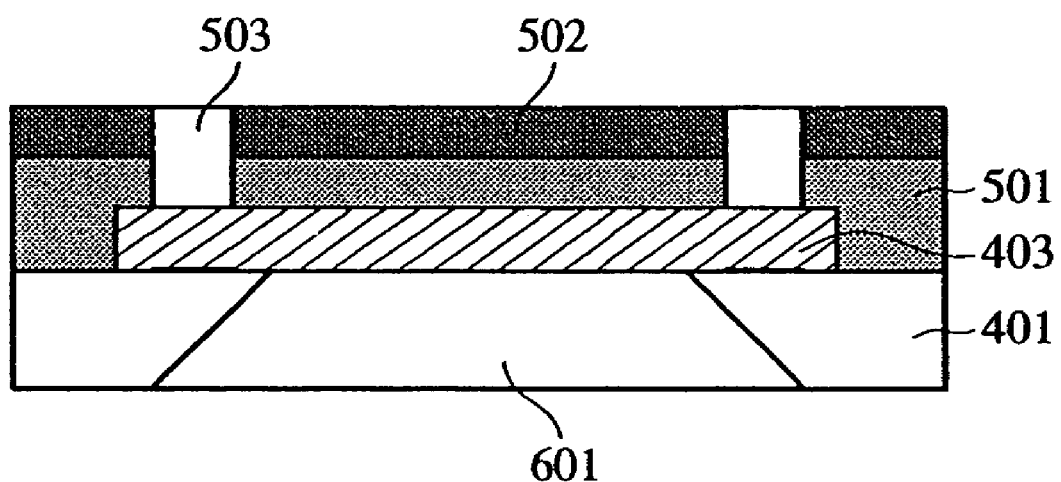
FIGS. 6A and 6B are drawings respectively showing steps performed after the steps shown in FIG. 5C.
Figure 6B:
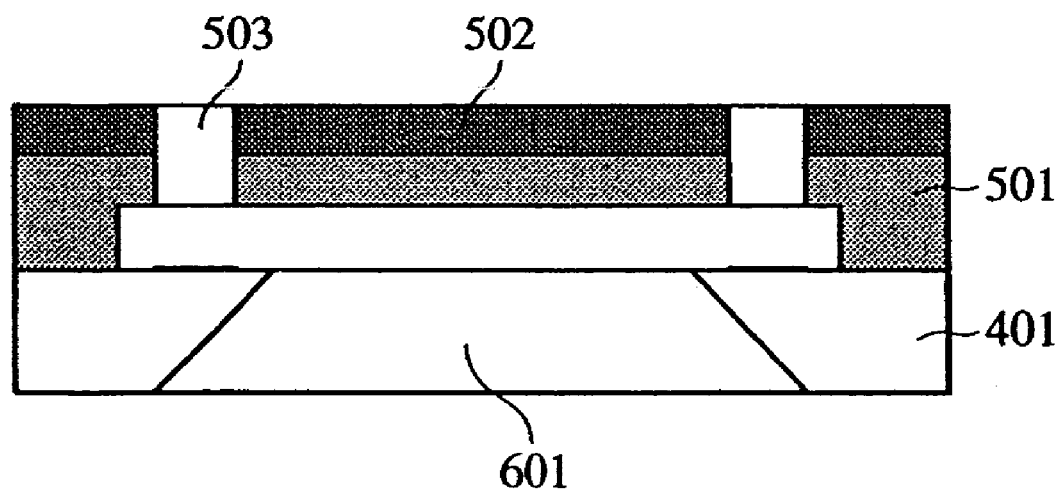

After the flow path forming material layer 501 was deposited, it was dried at 80° C. on a hot plate for 3 minutes. Then, a solution of each of Examples 1 to 4, respectively containing Composition Examples 1 to 4. was coated on the deposited layer by spin coating to form a film 502, as shown in FIG. 5B. The thus-formed first (501) and second (502) photosensitive resin layers were exposed to ultraviolet rays of 1.0 J/cm² through a mask having the pattern of a discharge orifice portion using Canon mask analyzer MPA600, heat-treated at 90° C. for 4 minutes, and then immersed in a developer containing MIBK and xylene at a ratio of 2:3 to form discharge orifices 503 (FIG. 5C). Then, as shown in FIG. 6A, an ink supply port 601 was formed at the back of the Si substrate 401 by anisotropic etching, and, as shown in FIG. 6B, the resist layer 403 was finally removed. Furthermore, the first (501) and second (502) photosensitive resin layers were heat-treated at 200° C. for 1 hour for the purpose of completely curing the layers to complete nozzles.

The thus-obtained nozzles were incorporated into an ink-jet recording head and electrically wired in a predetermined manner. The ink-jet recording head was mounted in a printer, and a long-term printing durability test was conducted using an ink-jet ink comprising pure water, glycerin, food black 2 (water-soluble black dye), and N-methylpyrrolidone at a ratio of 70:15:3:12 (parts by mass).

The printing durability test was conducted by printing a document and a pattern for evaluation of ink landing precision on 100 sheets of paper. Finally, the distortion of the printed dots was observed by referring to a sample print. The results are shown in column T3-1 in Table 2.

Rank A: Dot positions were not replaced, and printed characters were clear.
Rank B: Dot positions were slightly replaced, and printed characters were only slightly affected by the displacement.
Rank C: Dot positions were considerably replaced, and clarity of printed characters was poor.
Rank D: A considerable number of dots were missing, and printed characters were of a poor quality.

In addition, the surface of each of the recording heads used was observed after the test to evaluate ink adhesion. The results are shown in column T3-2 in Table 2.

Rank A: Ink droplets were scarcely observed on the nozzle surface.
Rank B: Small ink droplets were observed on the nozzle surface.
Rank C: Large ink droplets were observed near the discharge port of the nozzle.

Comparative Example 1

Each of the measurements T1 to T3 was performed by the same method as in Example 1, except that bisphenol AF (the structure below), which is a fluorine-containing epoxy resin, was used in place of the epoxy resin of Example 1.

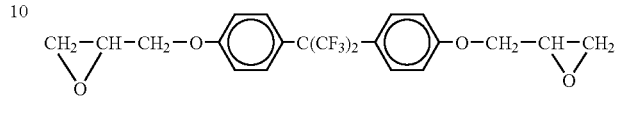

Comparative Example 2

Instead of the epoxy resin composition used in the present invention, Flurorad TM FC-722 (fluoro-coating agent, produced by Sumitomo 3M) was coated on a molded plate of polyether sulfone using a spinner so that the thickness after evaporation of the solvent was about 2 μm. Then, the surface of the resultant coating was treated by drying at 100° C. for 30 minutes. Then, this plate was irradiated with an exicmer laser at a wavelength of 195 μm, which was converged to a beam diameter of 5 μm, from above to form a nozzle opening. However, the opening could not be satisfactorily formed, and a large amount of decomposition residue was produced at the edge, thereby causing a nonuniform surface state. Under this condition, a substrate was formed by the same method as Example 1, and the same evaluations as T1 to T3 were performed by the same methods as Example 1. The results are shown in Table 2.

TABLE 2

Results of Evaluation

| compo-sition | T1: Contact angle (°) | | | | T2: Immersion Test Contact Angle (°) | | T3: Long-Term Printing Durability Test | |
|---|---|---|---|---|---|---|---|---|
| | pure water | oleic acid | glyc-erin | surfac-tant | before | after | T3-1 | T3-2 |
| Example 1 | 97 | 86 | 96 | 91 | 90 | 80 | A | B |
| Example 2 | 104 | 91 | 100 | 86 | 93 | 81 | A | A |
| Example 3 | 105 | 95 | 105 | 90 | 95 | 85 | B | A |
| Example 4 | 106 | 98 | 106 | 93 | 98 | 88 | A | A |
| Comp. Example 1 | 88 | 72 | 87 | 80 | 90 | 74 | C | C |
| Comp. Example 2 | 105 | 97 | 108 | 92 | 106 | 90 | C | C |

As described above, a film comprising the resin composition of the present invention exhibits a large contact angie and excellent durability. Therefore, an ink would not adhere to the surface of the printing head even if the surface is held in contact with an ink for a long period of time so that ink droplets have excellent landing precision, and a high printing quality could be maintained for a long period of time.

Example 5

Each of Composition Examples 1 and 3, respectively used in Examples 1 and 3, was coated on a molded plate of polyether sulfone using a spinner so that the thickness after evaporation of the solvent was about 2 μm and then dried. Then, this plate was irradiated with light with a total of 10 J/cm² from a high-pressure mercury lamp to perform polymerization curing of the film. Then, the plate was irradiated with an excimer laser at a wavelength of 195 μm, which was converged to a beam diameter of 5 μm, from above to form a nozzle opening. The opening was satisfactorily formed, and no decomposition residue was produced at the edge. As a result, it was found that the composition of the present invention has excellent suitability to processing with an ultraviolet laser, As described above, according to the present invention, there is provided a resin composition suitable as a water-repellent agent or water-repellent coating material which can be applied to a surface which is apt to be brought into contact with a solution or substance containing a component that can damage the film forming property and adhesion of the water-repellent agent. Also, according to the present invention, there is provided a resin composition permitting surface modifying treatment, thereby making it possible to maintain in clear state.

Furthermore, according to the present invention, there is provided an ink-jet recording head and liquid-jet recording apparatus in which the surface of a nozzle can be maintained in a clear state by treating the substrate with the resin composition of the present invention so that ink would not adhere to the surface of a printing head even if it is in contact with the ink for a long period of time, thereby improving the landing precision of dots, and maintaining a print quality for a long time.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An epoxy resin composition comprising:
    an epoxy resin having at least two alicyclic epoxy groups, at least one perfluoroalkyl group having 6 to 12 carbon atoms, and at least one alkylsiloxane group; and
    a cationic polymerization catalyst,
    wherein the alicyclic epoxy groups and the perfluoroalkyl group are present in branched chains of the epoxy resin, and the alkylsiloxane group is present in a main chain of the epoxy resin.
2. The epoxy resin composition according to claim 1, wherein the epoxy resin is represented by formula (1):

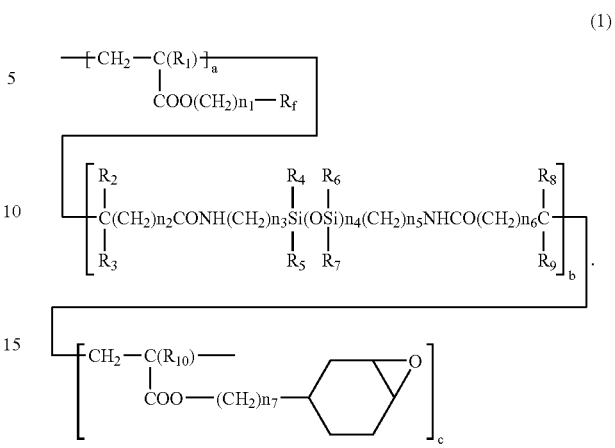

wherein a is an integer from 1 to 50, b is an integer from 1 to 50, c is an integer from 2 to 100, each of $n_1$, $n_2$, $n_3$, $n_5$, $n_6$, and $n_7$ is an integer from 1 to 5, $n_4$ is an integer from 2 to 200, each of $R_1$, $R_4$, $R_5$, $R_6$, $R_7$, and $R_{10}$ is independently a hydrogen atom or a straight or branched alkyl group having 1 to 3 carbon atoms, each of $R_2$, $R_3$, $R_8$ and $R_9$ is independently a hydrogen atom, a straight or branched alkyl group having 1 to 3 carbon atoms, or a nitrile group, and $R_f$ is a perfluoroalkyl group having 6 to 12 carbon atoms.

3. The epoxy resin composition according to claim 1, wherein the epoxy resin is represented by formula (2):

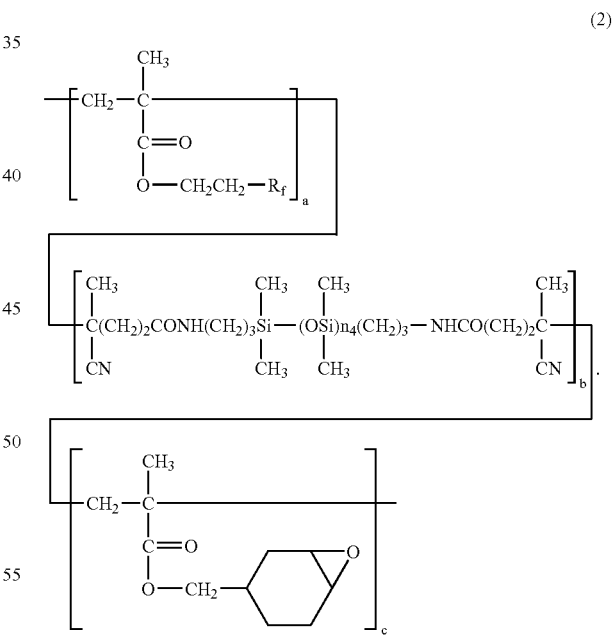

wherein $R_f$, $n_4$, a, b, and c are defined according to formula (1).

4. The epoxy resin composition according to claim 1, wherein the cationic polymerization catalyst comprises an onium salt of a Lewis acid.

5. The epoxy resin composition according to claim 1, further comprising at least one compound represented by formula (3) or (4):

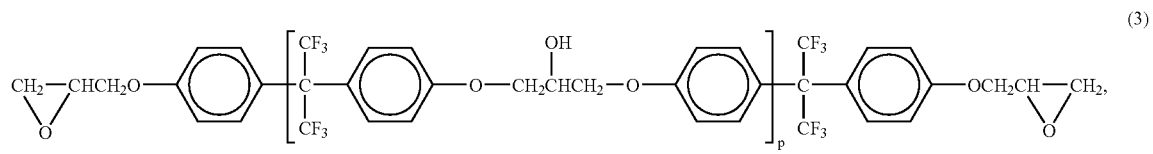

(3)

wherein p is an integer from 0 to 2

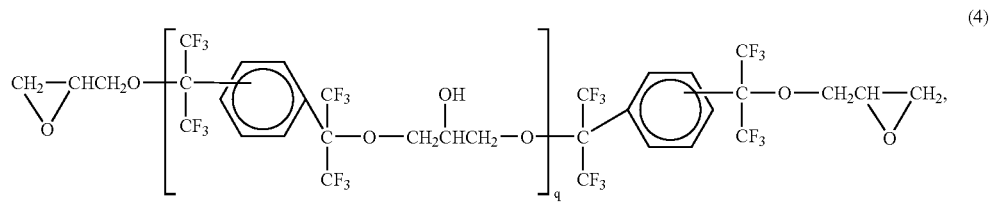

(4)

wherein q is an integer from 0 to 2, and

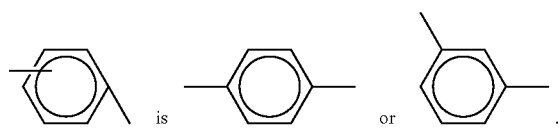

6. A surface treatment method for selectively treating a surface of a substrate, the method comprising the steps of:
   (i) coating an epoxy resin composition according to claim 1 on the surface of the substrate to form a film;
   (ii) irradiating at least a portion of the film with an active energy ray; and
   (iii) dissolving at least a portion of the film which was not irradiated in a liquid capable of dissolving the film to remove the at least a portion of the film which was not irradiated.

7. A surface treatment method for selectively treating a surface of a substrate, the method comprising the steps of:
   (i) coating an epoxy resin composition according to claim 1 on the surface of the substrate to form a film;
   (ii) curing at least a portion of the film by polymerization; and
   (iii) removing an uncured portion of the film.

* * * * *

UNITED STATES PATENT AND TRADEMARK OFFICE
CERTIFICATE OF CORRECTION

| | | |
|---|---|---|
| PATENT NO. | : 7,399,502 B2 | Page 1 of 1 |
| APPLICATION NO. | : 11/166124 | |
| DATED | : July 15, 2008 | |
| INVENTOR(S) | : Akihiko Shimomura et al. | |

It is certified that error appears in the above-identified patent and that said Letters Patent is hereby corrected as shown below:

COLUMN 2

Line 24, "degrade" should read --degrades--.

COLUMN 11

Line 48, "and-glass" should read --and glass--; and
Line 53, "part" should read --parts--.

COLUMN 12

Line 51, "Any-one" should read --Any one--.

COLUMN 15

Line 36, "As-the" should read --As the--.

COLUMN 18

Line 25, "exicmer" should read --excimer--; and
Line 67, "angie" should read --angle--.

Signed and Sealed this

Sixteenth Day of December, 2008

JON W. DUDAS
*Director of the United States Patent and Trademark Office*